Feb. 28, 1939.  E. J. PILBLAD  2,148,499
LOCKING DEVICE
Filed March 1, 1937
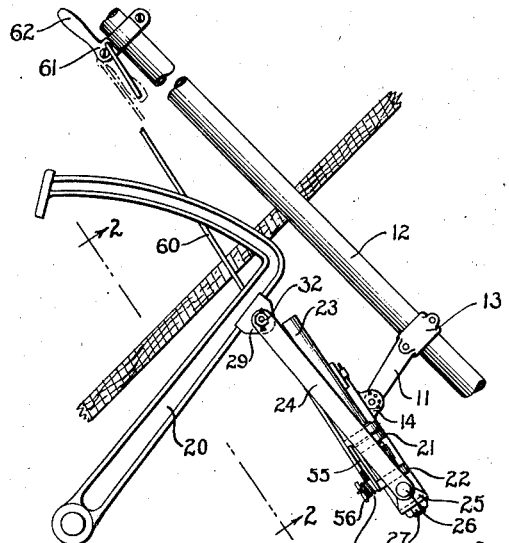
Fig 1
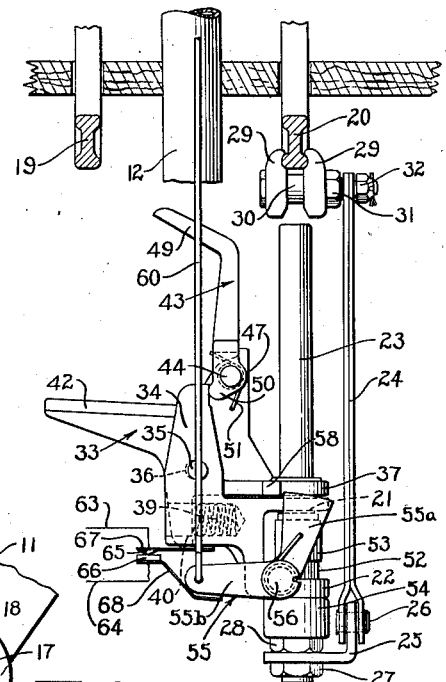
Fig 2
Fig 1a
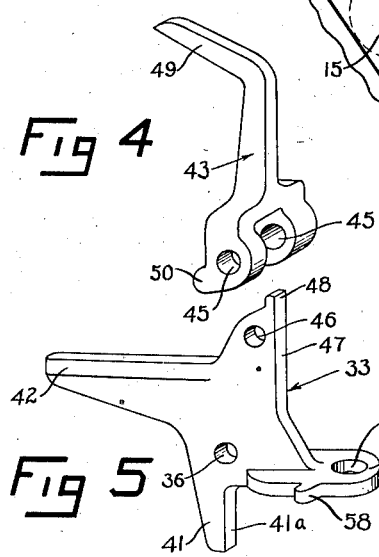
Fig 4
Fig 5
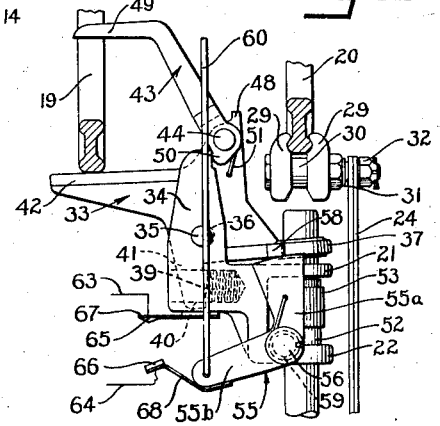
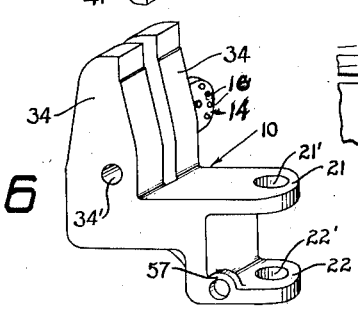
Fig 6
Fig 7
Fig 3
INVENTOR.
Eric J. Pilblad
BY
F. Bascom Smith
ATTORNEY.

Patented Feb. 28, 1939

2,148,499

UNITED STATES PATENT OFFICE 2,148,499

LOCKING DEVICE

Eric J. Pilblad, Rockville Centre, N. Y., assignor of twenty-six and one-fourth per cent to Charles C. Strange, seventeen and one-half per cent to Alan J. McIntosh, seventeen and one-half per cent to Alvan L. Barach, and twelve and one-half per cent to Edmund J. Barach, all of New York, N. Y.

Application March 1, 1937, Serial No. 128,337

13 Claims. (Cl. 192—13)

This invention relates to locking devices and more particularly to apparatus whereby the locking and releasing of a movable member may be controlled by a second member which is movable relative to said first member.

One of the objects of the present invention is to provide novel apparatus whereby the braking mechanism of a vehicle may be locked or held in applied position and released under control of the clutch mechanism of said vehicle.

A large number of devices of various types and operating on various principles have been heretofore proposed whereby the brakes of an automotive vehicle may be held in applied position without the exertion of a continued manual pressure upon the brake operating pedal in order that the driver's right foot may be free for use in actuating the accelerator pedal, particularly when the vehicle is being started on a hill. None of these prior devices have been entirely satisfactory and most of the same are wholly impractical from a commercial point of view. A majority of the devices of the above character which have been heretofore provided have been very complicated in construction, expensive to manufacture, difficult to install and subject to frequent failure because of the large number of parts employed. The mode of operation of certain of said prior art devices has necessitated a material change in the average driver's mode of operating an automobile and the use of such a device constitutes a real danger when the car on which it is installed is driven by one who is not experienced and skilled in operating the device. Other devices, in fact substantially all of the prior art devices having any merit whatever, have been such as to interfere with the free operation of the clutch and brake mechanisms in the usual or any desired manner. Additionally, the construction of prior art devices of the above character has been such as to necessitate the manufacture of a different model or type for substantially each make and each model automobile thereby necessitating a large number of jigs, dies, etc., and materially enhancing the cost of manufacture.

It is accordingly another object of this invention to provide a novel brake holding device which may be so constructed as to be suitable for installation and satisfactory operation on a large number of different makes and models of automotive vehicles.

Another object is to provide means for holding the brakes of an automotive vehicle in applied position wherein novel means are employed for connecting the brake mechanism to the holding mechanism to thereby insure freedom of operation of the former at all times.

Still another object is to provide novel apparatus of the above type which may be inexpensively constructed from a small number of comparatively rugged parts which may be readily assembled, said apparatus being very simple both in construction and operation and adapted to occupy only a small amount of space.

A further object is to provide brake locking apparatus for an automotive vehicle which is so constructed that the same may be quickly and properly installed by an ordinary mechanic.

A still further object is to provide novel brake holding means for an automotive vehicle which may be rendered operative in a very simple manner at the will of the driver and which does not interfere in any way with the normal operation of any part of the vehicle.

Another object is to provide a brake holding device which may either be installed on existing cars or built into new ones as original equipment thereon.

Still another object is to provide a device adapted for use on automobiles which is so constructed that the brakes may be held in applied position thereby at the will of the driver irrespective of the position of the gears in the transmission and one which is not affected in any way by the vibration or jarring of the vehicle, by inertia when the speed of the vehicle is increased or decreased, or by gravity when the vehicle is on an incline.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference being primarily had for this latter purpose to the appended claims.

In the drawing, wherein like reference characters refers to like parts throughout the several views, Fig. 1 is a somewhat diagrammatic side elevation partly in section and with parts broken away, of one form of device embodying the present invention installed on an automobile;

Fig. 1a is a detail view on an enlarged scale of a portion of the device shown in Fig. 1;

Fig. 2 is a rear view on an enlarged scale, partly in section and with parts broken away, the view being taken substantially on line 2—2 of Fig. 1;

Fig. 3 is a similar view showing the parts in position for holding the brakes in applied position;

Figs. 4, 5 and 6 are detail isometric views of the cam or releasing member, the locking member, and the guide member, respectively, of the device of Fig. 1; and, Fig. 7 is an enlarged detail view, partly in section and with parts broken away, showing the locked and unlocked positions of the locking member.

In general, the single embodiment of the invention illustrated, by way of example, comprises means for locking the brake mechanism of an automotive vehicle in applied position, said means being adapted to be rendered operative to hold the brakes only at the will of the driver and being so constructed as to not interfere in any way whatever with the normal or emergency application and release of the brakes, except when said means are consciously rendered operative by the driver. The locking means is preferably controlled by an element of the clutch mechanism in such a manner that an additional movement and slight effort in addition to that ordinarily employed in actuating the clutch is required to render said locking means operative. Said additional effort need not be a continuing effort, however, during the entire time that the brakes are being held in applied position but only a slight temporary effort to be applied during the last fraction of an inch of clutch pedal movement, for example, in clutch disengaging direction. The release of the locking means and, hence, of the brakes is accomplished by the release of the clutch mechanism for movement toward engaged position, it being possible, if desired, to time the brake release in any suitable manner with respect to the actual engagement of the clutch driving surfaces. It is usually desirable to release the brakes at substantially the same instant that the clutch plates or driving surfaces of the vehicle clutch mechanism engage and thereby prevent any rolling of the vehicle when starting up an incline.

In the form illustrated, the device embodying the invention comprises a supporting member or frame 10 adapted to be mounted in a novel manner on an arm 11 which is, in turn, secured to the steering column 12 or other suitable part of the vehicle by means of a bracket 13. In order that supporting member or frame 10 and, hence, the complete locking device, to be hereinafter described, may be rendered available for satisfactory use on more than one make or model of automobile, said frame is secured to arm 11, 13 for angular adjustment relative thereto. As shown, member 10 is provided with a fan-shaped portion 14 having a central opening 15 and a plurality of openings 16 therein, the latter openings being arranged on an arc about central opening 15. Arm 11 and member 10 are pivotally secured to one another by a bolt 17 and said arm is provided with a laterally projecting pin 18 which is adapted to extend into one of the openings 16 for normally holding said frame and arm against relative angular movement. Thus, by loosening the connection at bolt 17 and shifting the parts so that pin 18 registers with another of the openings 16, the angularity between arm 11 and member 10 may be readily changed. Frame 10 is thus adjustably supported in a fixed position in a vertical plane between the clutch pedal 19 and brake pedal 20, said pedals being of the type provided on all modern automobiles.

On the brake pedal side of frame 10, the same is provided with a bifurcated portion comprising arms or lugs 21 and 22 which have aligned openings 21' and 22' therein for slidably receiving a portion of novel movable means, the other portion of which is adapted to engage an element of the brake mechanism, such as brake pedal 20, whereby freedom of operation of the brake mechanism in the normal manner is insured. In the form shown, said novel means comprise a cylindrical rod 23 slidably extending through aligned openings 21' and 22' and a link 24 interposed between the brake pedal and the end of said rod which is remote from said pedal. The lower bifurcated end of said link is pivotally secured to a bracket 25 by means of a pin 26, said bracket being, in turn, secured to said remote end of rod 23 by means of a pair of nuts 27 and 28 that are threaded on said rod.

Any suitable means may be provided for pivotally securing the other or upper end of link 24 to brake pedal 20, said means, in the form shown, comprising a pair of clamping jaws 29, 29 loosely mounted on a pin 30 and adapted to be held in biting or clamping relation with pedal 20 by a nut 31 threaded onto a reduced portion of said pin. An extension of said reduced portion slidably extends through the upper end of link 24 and the latter is maintained in position thereon by a nut 32 which may be locked in spaced relation from nut 31 by means of a pin or cotter key to thereby permit free angular movement of link 24 relative to pin 30. Thus, when the brake pedal is depressed, link 24 and rod 23 will be moved downwardly thereby, the latter sliding freely through openings 21' and 22'. Because of the length of the connecting link 24 and its pivotal connection to both the brake pedal and rod 23, free movement of rod 23 is obtained irrespective of the fact that the portion of brake pedal 20 to which clamps 29 are secured, does not move in the same straight line as said rod. In some similar devices heretofore provided, an element corresponding to rod 23 is connected directly to the brake pedal whereby said element, during movement of the pedal, is subjected to a laterally directed force which tends to cause said element to bind in openings corresponding to openings 21', 22'.

For the purpose of locking the brake mechanism in applied position, i. e., with pedal 20 depressed, there is provided a locking member 33 (Fig. 5) which is adapted to be controlled by the driver through actuation of clutch pedal 19 for causing the same to frictionally grip rod 23 and hold the same against upward or brake-releasing movement. As shown, said locking member is pivotally secured to frame member 10 between an upwardly extending bifurcated portion 34 of the latter by means of a pivot pin 35, which extends through openings 34' and 36. For a purpose to hereinafter appear, opening 36 in member 33, through which pin 35 extends, is slightly elongated. Extending laterally to the right, as viewed in Fig. 5, and formed integrally with member 33 is a flat, comparatively thin portion 37 having an opening 38 therein through which rod 23 is adapted to freely extend, the diameter of said opening being slightly greater than the diameter of said rod.

Locking member 33 is normally held in inoperative or unlocking position, that is, with portion 37 perpendicular to the longitudinal axis of rod 23 and with the center line of opening 38 coinciding with said axis and the center line of openings 21' and 22', by means of a light coil spring 39. The latter, in the embodiment shown, is loosely supported in a recess 40 which is counter-sunk in the lower portion of member 10 and acts against face 41a of a downwardly extending arm 41 formed integrally with said locking member. The above parts are preferably so constructed and assembled that arm or lug 21 constitutes stop means for limiting the pivotal movement of member 33 in a clockwise direction, as viewed in the drawing, by spring 39 whereby said member is normally held in unlocked position permitting free movement of rod 23 and, hence, of the vehicle brake mechanism in both brake applying and brake releasing direction.

A laterally extending arm portion 42 of locking member 33 extends beneath clutch pedal 19 in a position such that the same will be engaged by said pedal during the last part of the downward or clutch disengaging stroke of the latter, that is, a portion of the clutch pedal stroke after the clutch surfaces have been disengaged and preferably the last fraction of an inch of said stroke. When arm 42 is thus engaged and pivoted in a counter-clockwise or locking direction, as viewed in Fig. 3, locking portion 37 moves to an angular or tilted position with respect to rod 23 and frictionally grips the same, thereby holding the brakes against release from any position to which the latter have been moved by manipulation of brake pedal 20. The diameter of opening 38 is preferably so proportioned with relation to the diameter of rod 23 as to limit the tilting movement of locking member 33, 37, i. e., the pivotal movement thereof about pin 35 so that face 41a of arm 41 is never permitted to contact frame 10. Thus, when the brakes are in applied position and member 33, 37 is tilted to locking position, the walls of opening 38 engage or bite rod 23, as at points a and b (Fig. 7) and the forces, which normally tend to release the brakes and, hence, tend to slide rod 23 in an upward direction, also tend, by reason of said frictional or biting engagement, to further pivot locking member 33 in a locking direction against the efforts of spring 39. The biting action between member 37 and rod 23 is accordingly increased by the forces acting on said rod and insures that the brakes will be firmly held in applied position. Because of the different radii of the arcs of movement of points a and b on locking member 37 during the pivotal movement of the latter, points a would, if the pivotal axis of member 33, 37 were fixed, engage the surface of rod 23 prior to the engagement of point b and prevent the proper biting action and, hence, the secure locking engagement with said rod which is necessary. In order to obviate this, opening 36 in the locking member is elongated to permit said member to have slight linear movement toward and away from rod 23 and thus permit both points a and b to firmly engage rod 23 when the locking member is moved by the clutch pedal to the dotted line position of Fig. 7. If desired, openings or bearings 34' could be elongated to permit lateral movement of pivot pin 35.

When member 33 is held in tilted or locking position, the brakes may, nevertheless, be applied or further applied with very little more than normal effort on the part of the driver since the friction at points a and b is comparatively slight when the pressure exerted by rod 23 tends, through frictional engagement, to move locking member 33, 37 toward unlocked position. Thus, when a force tending to move rod 23 downwardly is exerted thereon, there is no increasing tendency for locking member 33, 37 to bite the rod, as there is when the forces acting on the latter tend to move the locking member away from its neutral or unlocking position. It is accordingly impossible for the device of the present invention to prevent the application of the brakes by the driver at any time he desires to apply the same even though pressure is being applied to the locking member by clutch pedal 19. Spring 39 is preferably of sufficiently light construction so that, once member 33 is moved to locking position by the downward movement of the clutch pedal and after pressure exerted by the driver on the brake pedal is released, said spring will be incapable of moving said member to unlocked position, the frictional or biting engagement between said member and rod 23, which is enhanced by forces which urge the brake mechanism toward released position, being adapted to effectively resist the efforts of spring 39. Accordingly, the clutch pedal need not be held in continuous contact with arm 42 to maintain the locking means in operative position. It will be seen, however, that, if it is desired to release the gripping action of member 33, 37 without engaging the clutch driving surfaces, it is only necessary to apply a slight downward pressure on the brake pedal to relieve the upward pull of rod 23 whereupon the biting action of said member is sufficiently decreased so that spring 39 becomes effective to pivot said member to unlocking position. As will hereinafter appear, however, means are provided whereby the locking member may be released by movement of the clutch pedal either at the time of or at any time prior to the actual engagement of the clutch driving surfaces.

In order that the driver may have his or her right foot free for actuating the engine throttle or accelerator, such as when starting on the side of a hill, means are provided whereby the above-described locking means for holding the brakes in applied position may be automatically released upon the movement of the clutch mechanism toward engaged position. Said means, in the form shown, comprise a pivoted lever (Fig. 4) which constitutes cam means for moving locking member 33, 37 to unlocking position. Said lever is pivotally mounted on locking member 33 by a pin 44 which extends through openings 45 in the arms of the lower bifurcated portion of the lever and an opening 46 through an upwardly projecting portion 47 of said locking member, said latter portion extending between the arms of said bifurcated portion. A lug 48 on the upper end of projection 47 is adapted to engage the center portion of lever 43 and act as a stop for limiting the clockwise movement of said lever. The upper end 49 of lever 43 is preferably slightly bent toward pedal 19 and the arms of the bifurcated portion thereof terminate in lobes or cams 50 which engage arms 34 of supporting frame 10.

When locking member 33 is in unlocked position, pawl or lever 43, 49 is maintained in the position illustrated in Fig. 2 by a light spring 51 that is coiled around pin 44. One end of said spring is anchored in locking member 33 and the other end engages arm 43. The movement of lever 43 by spring 51 may be limited by the engagement of cams 50 with arms 34 or by an upwardly extending lug 48 on locking member 33. As the locking member is pivoted to tilted or locking position (Fig. 3) by a downward movement of clutch pedal 19, pivot 44 moves in an arc to the left, as viewed in the drawing, and, since the lower end of lever 43 is prevented from moving in that direction by reason of the engagement of cams 50 with arms 34, the upper end thereof swings to a position such that portion 49 extends into the path of the clutch pedal. Upon the release of the latter by the driver to permit the clutch driving surfaces to engage, lever 43, 49 is engaged by said pedal and pivoted in a clockwise direction. Pivot 44 is thus moved to the right through the action of cams or lobes 50, thereby pivoting locking member 33 to unlocked position and accordingly releasing the brake mechanism. By reason of the fact that arm 43, 49 is much longer than the distance from pivot 44 to the tips of lobes 50, a substantial mechanical advantage is provided for releasing the grip of member 33, 37 on rod 23.

Suitable means are preferably provided for retarding the movement of brake pedal 20 when the same is released in the manner above described, said means, in the form shown, comprising a sleeve 52 surrounding rod 23 between arms 21 and 22 of supporting member 10, said sleeve being made of fiber or some other suitable material between which and the metal of rod 23 the coefficient of friction is relatively high. Sleeve 52 is split longitudinally thereof (Fig. 7) and is surrounded by a band 53 made of rubber or other suitable resilient material which is adapted to yieldingly hold said sleeve in close, frictional engagement with rod 23. The friction between sleeve 52 and said rod should be such as to prevent too rapid return of the brake pedal and yet not materially increase the pressure required to apply the brakes.

Suitable means are also provided for cushioning the return movement of the brake pedal, said means, in the form shown, being constituted by a pad or band 54 made of some suitable yielding material, such as rubber. Said pad surrounds rod 23 between nut 28 and the lower face of arm 22 on member 10.

Novel means are provided in combination with the above-described locking mechanism whereby the brakes may be held in applied position and the clutch simultaneously held in disengaged position without the application of any continuous effort by the driver on either the clutch or brake pedal. The brake locking device of the present invention is thus rendered available for holding the service brakes of a car in applied position when no occupants are present in the car. In the form illustrated, said means are constituted by a bell crank lever 55 pivotally mounted on member 10 by means of a pivot pin 56 which extends into a boss 57 formed on arm 22 (Fig. 6). The outer or free end of arm 55a of lever 55 is adapted to engage the lower surface of a lug 58 projecting from locking member 33, 37 when said member is in locking position and lever arm 55a is pivoted in a counter-clockwise direction (Fig. 3), the outer end of said lever constituting in effect a cam with the radius thereof increasing gradually from the left edge to the right edge thereof. A spring 59 which normally tends to pivot lever 55 in a counter-clockwise direction, i. e., toward operative position for holding member 33, 37 in locked position is preferably provided, said spring being coiled under tension around pivot pin 56 and anchored at one end thereof in a slot in the head of pin 56 and at the other end to lever arm 55a.

Lever arm 55b of lever 55 extends substantially at right angles to arm 55a and is connected by means of a rod 60 to the short arm of a small bell crank lever 61 (Fig. 1) pivotally mounted on steering column 12 or other suitable part of the vehicle in a convenient place for manual operation by the driver. When handle 62 of lever 61 is in the full-line position, bell crank 55 will be held in inoperative position, as illustrated in Fig. 2, and, when said handle is moved by the driver to the dotted line position, bell crank 55 will assume the position shown in Fig. 3. With the parts in the latter or operative position, clutch pedal 19 may be released by the driver and lever 43, 49 will serve as a stop for said pedal as long as locking member 33 is held against clockwise movement by bell crank arm 55a.

In order that the usual brake-operated tail light (not shown) provided on all modern automobiles will not be kept burning while the brakes are held in applied position, in the manner last described, switch means operative by the holding mechanism including lever 55 are provided for controlling the circuit 63, 64 containing said light. In the form shown, said switch means are constituted by a pair of contacts 65 and 66 mounted on resilient arms 67 and 68 that are, in turn, mounted on and insulated from member 10 and crank 55, respectively. Swith 65, 66 is held in closed position when member 55 is in inoperative position (Fig. 2) and in open position when said member is moved to operative position (Fig. 3). The complete tail light circuit may be of any suitable construction, many of which are well known in the art. Since said circuit, per se, constitutes no part of the present invention, it is not believed to be necessary to show the same in detail.

In the operation of an automobile equipped with the above device, it will be seen that the brake and clutch mechanisms may be freely operated in the usual manner without interference from said device, the latter being rendered operative only at the express will of the driver. When it is desired to render the locking device operable, the brakes are applied in the usual manner, and, after the clutch has been disengaged, a slight additional pressure is applied to arm 42 of locking member 33 by clutch pedal 19, whereupon cam member 43, 49 is moved to the position of Fig. 3, in the manner fully described above. It has been found in actual practice that the driver does not actuate locking member 33, 42 during the normal operation of the clutch, said member being actuated only when the driver exerts a conscious, additional effort at the extreme end of the clutch pedal stroke. When the locking device has been applied, however, by depressing arm 42 by means of clutch pedal 19, the driver may take his right foot off the brake pedal and the brakes will be held in applied position until clutch pedal 19 on its upward or engaging movement engages and pivots member 43, 49 to thereby move locking member 33 to unlocked position through the coaction of cams 50 and arms 34. If desired, lever 43 may be made of such length as to extend across the path of pedal 19 to a point whereby the brakes will be released at substantially the same instant that the clutch driving surfaces engage, thereby obviating any possibility of rolling backwards when it is necessary to start the vehicle on the side of a hill. If, when the device is in locking position, as shown in Fig. 3, the driver wishes to release the brakes without engaging the clutch, it is only necessary for him to release clutch pedal 19 until it disengages arm 42 and then exert a slight downward pressure on the brake pedal. When this is done, locking member 33 will be moved to inoperative position by spring 39. When locking member 33 is in position for holding the brakes in applied position, the driver may move handle 62 to the dotted-line position (Fig. 1) and, hence, move bell crank 55 to the position shown in Fig. 3 for positively holding said locking member in operative position. Clutch pedal 19 may then be released by the driver and will be held against complete clutch engaging movement by lever 43, 49.

There is thus provided novel apparatus which is particularly adapted for holding the brakes of an automotive vehicle in applied position, said apparatus being so constructed that it will not interfere in any way with the normal operation of the brake and clutch mechanisms, the same being rendered operative only at the conscious will of the operative. Novel means are provided for connecting the device to a vehicle and for connecting the same to movable parts thereof to thereby render a single model of the device available for use on a large number of different makes and models of cars and obviating any danger of binding of the parts which would in any way interfere with the movable elements of the vehicle. The operation of the novel device provided is very simple and there is no danger that the brakes will ever be held in applied position while the vehicle is in motion or without the conscious knowledge of the driver. Said apparatus embodies means controlled in accordance with the actuation of the clutch mechanism of the vehicle for applying and releasing the same and means whereby the locking device may be held in operative position when the driver releases the clutch pedal. The device of the present invention may be readily and inexpensively manufactured, the same comprising only a small number of simple, readily assembled parts and may be quickly and properly installed by any ordinary mechanic.

Although only a single embodiment of the invention has been illustrated and described in detail, it is to be expressly understood that the same is not limited thereto but that various changes may be made, particularly in the design and arrangement of parts illustrated without departing from the spirit and scope of the invention, as will now be apparent to those skilled in the art. For a definition of the limits of the invention, reference will be had primarily to the appended claims.

What is claimed is:

1. In combination with the brake and clutch mechanisms of a motor vehicle, a brake locking device comprising supporting means on said vehicle, a member movable relative to and guided by said supporting means, means for holding said member against movement relative to said supporting means, motion transmitting means pivotally connected to said member adjacent one end of the latter and pivotally connected to an element of the brake mechanism adjacent the other end of said member, and means controlled by the clutch mechanism for releasing said holding means.

2. In a vehicle having a brake mechanism, the combination with the latter of a brake locking device comprising supporting means on said vehicle, a member movable relative to and guided by said supporting means, means for holding said member against movement in at least one direction relative to said supporting means, and motion transmitting means pivotally connected to said member adjacent one end of the latter and pivotally connected to an element of the brake mechanism adjacent the other end of said member.

3. In a vehicle having a brake mechanism, the combination with the latter of a brake locking device comprising supporting means on said vehicle, a double-ended member movable relative to and guided by said supporting means, friction means for holding said member against movement in at least one direction relative to said supporting means, and motion transmitting means interposed between an element of said brake mechanism and the end of said member remote from said element.

4. In combination with the brake and clutch mechanisms of a motor vehicle, means for maintaining said brake mechanism in applied position including a movable member, holding means adapted to engage said member, means pivotally connected to an element of said brake mechanism and to said member at a point remote from said element, and means operable by movement of an element of said clutch mechanism for moving said holding means into and out of operative engagement with said member.

5. In a vehicle having a brake mechanism the combination with said brake mechanism of means for maintaining the latter in applied position including a longitudinally movable member, guide means therefor, and a motion transmitting link pivotally connected to an element of said brake mechanism and to said member adjacent the end of the latter remote from said element, said link being otherwise free for movement in space.

6. In combination with the brake and clutch mechanisms of a motor vehicle, means for maintaining said brake mechanism in applied position including a longitudinally movable member, guide means therefor and a motion transmitting link pivotally connected to an element of said brake mechanism and to said member adjacent the end of the latter remote from said element, and means operable by said clutch mechanism for controlling said first-named means to release said brake mechanism.

7. The combination with the brake and clutch pedals of a vehicle of a locking device comprising supporting means mounted on the vehicle, a rod slidably supported by said means, a link having one end thereof pivotally connected to said brake pedal and the other end thereof pivotally connected to said rod adjacent the end of the latter which is remote from said brake pedal, a locking member pivotally mounted on said supporting means and adapted to engage said rod, and means engageable by the clutch pedal for controlling said locking device.

8. The combination with the brake and clutch mechanisms of a motor vehicle of frictional means operable by the clutch mechanism for holding the brake mechanism in applied position, and manually operable means for maintaining said holding means in operative position independently of the clutch mechanism.

9. The combination with the brake and clutch mechanisms of a motor vehicle of means for holding said brake mechanism in applied position, means operable by the clutch mechanism for applying and releasing said holding means, and means for locking said holding means against release by said clutch mechanism.

10. In a motor vehicle having a brake pedal and a clutch pedal, the combination therewith of a guide member supported on a vehicle, a rod slidably extending through said guide member, motion transmitting means pivotally connected to the brake pedal and to said rod at a point remote from said pedal, a locking member pivotally mounted on said guide member and having an opening through which said rod extends, means operable by the clutch pedal for moving said locking member into and out of locking engagement with said rod, and means operable at the will of the driver of the vehicle for holding said locking member in locking position, said last-named means including a cam member pivotally mounted on said guide member and means for moving said cam member into operative engagement with said locking member.

11. A brake holding device for vehicles comprising a guide member, an element slidably extending through said guide member, means operatively connected to said element and a part of the brake mechanism of the vehicle, a locking member adapted to engage said element for holding the brakes in applied position, and means for positively holding said locking member in locking position.

12. In combination with the brake and clutch mechanism of a motor vehicle, a double-ended movable member, motion transmitting means pivotally connected to an element of said brake mechanism and to said movable member at the end thereof remote from said element, a locking member adapted to engage said movable member to hold said brake mechanism in applied position, said locking member being adapted to be moved to locking position by movement of said clutch mechanism toward disengaged position, and means mounted on said locking member and engageable by said clutch mechanism during the clutch engaging movement thereof to release said locking means.

13. In combination with the brake and clutch mechanisms of a motor vehicle, a double-ended movable member, means pivotally connected to an element of said brake mechanism and pivotally connected to said movable member at the end of the latter which is remote from said element, means adapted to engage said movable member to hold said brake mechanism in applied position, and means pivotally mounted on said holding means and engageable by said clutch mechanism to release said holding means.

ERIC J. PILBLAD.